(12) United States Patent
Inoue (10) Patent No.: US 10,367,781 B2
(45) Date of Patent: Jul. 30, 2019

(54) INFORMATION PROCESSING APPARATUS, METHOD OF CONTROLLING THE SAME, AND STORAGE MEDIUM

(71) Applicant: CANON KABUSHIKI KAISHA, Tokyo (JP)

(72) Inventor: Go Inoue, Abiko (JP)

(73) Assignee: CANON KABUSHIKI KAISHA, Tokyo (JP)

(*) Notice: Subject to any disclaimer, the term of this patent is extended or adjusted under 35 U.S.C. 154(b) by 380 days.

(21) Appl. No.: 14/860,952

(22) Filed: Sep. 22, 2015

(65) Prior Publication Data

US 2016/0094512 A1    Mar. 31, 2016

(30) Foreign Application Priority Data

Sep. 29, 2014  (JP) ................................. 2014-198877

(51) Int. Cl.
*H04L 12/00* (2006.01)
*H04L 29/12* (2006.01)
*H04L 29/06* (2006.01)

(52) U.S. Cl.
CPC ...... *H04L 61/2007* (2013.01); *H04L 61/1511* (2013.01); *H04L 63/101* (2013.01)

(58) Field of Classification Search
CPC . H04L 67/1051; H04L 41/02; H04L 12/2818; H04L 63/08; H04L 63/10; H04L 41/5019
USPC ........ 709/208, 220, 225, 229, 224, 232, 245
See application file for complete search history.

(56) References Cited

U.S. PATENT DOCUMENTS

| 4,864,617 A * | 9/1989 | Holmquist ........ H04L 25/03866 375/368 |
| 5,946,104 A * | 8/1999 | Yoshida ............. H04N 1/33323 358/409 |
| 6,081,510 A * | 6/2000 | Valentine .............. H04L 1/0025 370/252 |
| 6,961,183 B2 * | 11/2005 | Wada ..................... G02B 5/285 359/584 |

(Continued)

FOREIGN PATENT DOCUMENTS

| JP | 2006211533 A | 8/2006 |
| JP | 2014-198877 A | 7/2007 |

(Continued)

OTHER PUBLICATIONS

Japanese Office Action issued in Appl. No. JP 2014-198877 dated Aug. 3, 2018, together with English language translation (6 pages).

*Primary Examiner* — Frantz Coby
(74) *Attorney, Agent, or Firm* — Carter, DeLuca & Farrell LLP (57) ABSTRACT

An information processing apparatus determines, when a data transmission is executed, whether or not a host name designated as a destination of the data transmission is set to a terminal list indicating an external terminal that is permitted as a data transmission destination, and if a result of the determination is that the host name is set to the terminal list, permits data transmission irrespective of whether or not an IP address corresponding to the host name is set to the terminal list; and executes data transmission if data transmission is permitted.

16 Claims, 7 Drawing Sheets

(56) References Cited

U.S. PATENT DOCUMENTS

| | | | | |
|---|---|---|---|---|
| 7,023,573 B2* | 4/2006 | Ohhashi | H04N 1/00843 | 358/1.15 |
| 7,127,496 B2* | 10/2006 | Isozu | H04L 29/06027 | 709/217 |
| 7,574,508 B1* | 8/2009 | Kommula | H04L 29/12066 | 709/226 |
| 8,363,604 B2* | 1/2013 | Gurelli | H04W 28/22 | 370/231 |
| 8,427,673 B2* | 4/2013 | Yamaguchi | H04N 1/00244 | 358/1.15 |
| 8,509,139 B2* | 8/2013 | Breslow | H04B 7/18584 | 370/316 |
| 8,832,283 B1* | 9/2014 | Roskind | G06F 15/16 | 709/223 |
| 8,838,784 B1* | 9/2014 | Kalavade | H04W 12/02 | 709/224 |
| 8,984,618 B2* | 3/2015 | Yoon | G06F 21/00 | 713/156 |
| 9,491,724 B2* | 11/2016 | Chen | H04W 56/00 | |
| 2001/0052007 A1* | 12/2001 | Shigezumi | H04L 29/12066 | 709/223 |
| 2003/0039259 A1* | 2/2003 | Madour | H04L 29/06 | 370/401 |
| 2009/0222582 A1* | 9/2009 | Josefsberg | H04L 41/0654 | 709/245 |
| 2011/0126292 A1* | 5/2011 | Ferg | G06F 21/57 | 726/26 |
| 2013/0133057 A1* | 5/2013 | Yoon | G06F 21/00 | 726/12 |
| 2014/0359041 A1* | 12/2014 | Bai | H04L 61/1511 | 709/207 |

FOREIGN PATENT DOCUMENTS

| | | |
|---|---|---|
| JP | 2008-079108 A | 4/2008 |
| JP | 2013-191958 A | 9/2013 |
| JP | 2013223169 A | 10/2013 |
| JP | 2014036391 A | 2/2014 |

* cited by examiner

DNS RECORD

| IP ADDRESS | HOST NAME |
|---|---|
| 160.1.1.1 | Sample.jp |
| 140.1.1.1 | Test.jp |
| | |
| | |

202

DNS RECORD

| IP ADDRESS | HOST NAME |
|---|---|
| 160.1.1.1 | Sample.jp |
| 150.1.1.1 | Test.jp |
| | |
| | |

INFORMATION PROCESSING APPARATUS, METHOD OF CONTROLLING THE SAME, AND STORAGE MEDIUM

BACKGROUND OF THE INVENTION

Field of the Invention

The present invention relates to an information processing apparatus comprising a filtering function, a method of controlling the same, and a storage medium.

Description of the Related Art

In recent years, performing access control so as to not allow connection to an external unnecessary terminal from the viewpoint of information leakage or security has become common. For example, in Japanese Patent Laid-Open No. 2013-191958, a technique in which a plug-in application is installed in a Web browser of a terminal and performs filtering so that a specific URL cannot be connected to is proposed. However, in a case where a connection to an external terminal is filtered on a Web browser, only connections that applications operating on the Web browser perform are targets of the filtering. In Japanese Patent Laid-Open No. 2008-79108, a technique of applying a transmission IP address filter to transmission packets from a terminal so as to filter connections to external terminals by all applications of the terminal is proposed. For example, it is possible to handle a use case such as where a user sets IP addresses to which transmission should be permitted, and then when a transmission to a terminal other than those of the set IP addresses is attempted, the transmission data is discarded within the terminal.

However, there is a problem with the above described conventional technique as recited below. For example, a user can only set an IP address for a terminal with the transmission IP filter of the above described conventional technique. For this reason, when the IP address of a terminal for which communication should be permitted is changed, it is necessary for the user to change the IP address set for the terminal. Accordingly, a problem may occur in that when the user forgets to change the setting of an IP address that should be permitted, not only is it that communication cannot be performed with an opposing terminal with which communication would originally be possible, but communication becomes possible with an opposing terminal with which communication should not be performed. In particular, in a case where the opposing terminal is a third-party management server, or the like, on the Internet, because a global IP address is changed without notification, there is a problem in that such a phenomenon can occur frequently.

SUMMARY OF THE INVENTION

The present invention enables realization of an arrangement for suitably establishing a connection by performing filtering of a connecting destination even if an IP address of an external terminal to which connection is permitted is changed.

One aspect of the present invention provides an information processing apparatus comprising: a determination unit configured to determine, when a data transmission is executed, whether or not a host name designated as a destination of the data transmission is set to a terminal list indicating an external terminal that is permitted as a data transmission destination; a filter control unit configured to, if a result of the determination by the determination unit is that the host name is set to the terminal list, permit data transmission irrespective of whether or not an IP address corresponding to the host name is set to the terminal list; and a transmission unit configured to execute data transmission if data transmission is permitted by the filter control unit.

Another aspect of the present invention provides an information processing apparatus comprising: a reception unit configured to accept a designation of a host name or an IP address from a user for specifying an external terminal that is permitted as a data transmission destination; a storage unit configured to store, as permission information indicating an external terminal that is permitted as a data transmission destination, the host name or the IP address that the reception unit accepted; and a control unit configured to permit execution of data transmission under a condition that, in a case where a host name is designated as a destination of a data transmission, the designated host name is included in the permission information, or an IP address corresponding to the designated host name is included in the permission information.

Still another aspect of the present invention provides a method of controlling an information processing apparatus, the method comprising: determining, when a data transmission is executed, whether or not a host name designated as a destination of the data transmission is set to a terminal list indicating an external terminal that is permitted as a data transmission destination; if a result of the determination is that the host name is set to the terminal list, permitting data transmission irrespective of whether or not an IP address corresponding to the host name is set to the terminal list; and executing data transmission if data transmission is permitted.

Yet still another aspect of the present invention provides a method of controlling an information processing apparatus, the method comprising: accepting a designation of a host name or an IP address from a user for specifying an external terminal that is permitted as a data transmission destination; storing, as permission information indicating an external terminal that is permitted as a data transmission destination, the host name or the IP address that is accepted; and permitting execution of data transmission under a condition that, in a case where a host name is designated as a destination of a data transmission, the designated host name is included in the permission information, or an IP address corresponding to the designated host name is included in the permission information.

Still yet another aspect of the present invention provides a non-transitory computer-readable storage medium on which is stored code of a computer program for causing a computer to execute a method for controlling an information processing apparatus, the method comprising: determining, when a data transmission is executed, whether or not a host name designated as a destination of the data transmission is set to a terminal list indicating an external terminal that is permitted as a data transmission destination; if a result of the determination is that the host name is set to the terminal list, permitting data transmission irrespective of whether or not an IP address corresponding to the host name is set to the terminal list; and executing data transmission if data transmission is permitted.

Yet still another aspect of the present invention provides a non-transitory computer-readable storage medium on which is stored code of a computer program for causing a computer to execute a method for controlling an information processing apparatus, the method comprising: accepting a designation of a host name or an IP address from a user for specifying an external terminal that is permitted as a data transmission destination; storing, as permission information indicating an external terminal that is permitted as a data transmission destination, the host name or the IP address that is accepted; and permitting execution of data transmission under a condition that, in a case where a host name is designated as a destination of a data transmission, the designated host name is included in the permission information, or an IP address corresponding to the designated host name is included in the permission information.

Further features of the present invention will be apparent from the following description of exemplary embodiments with reference to the attached drawings.

DESCRIPTION OF THE EMBODIMENTS

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

<Network Configuration>

Figure 1:
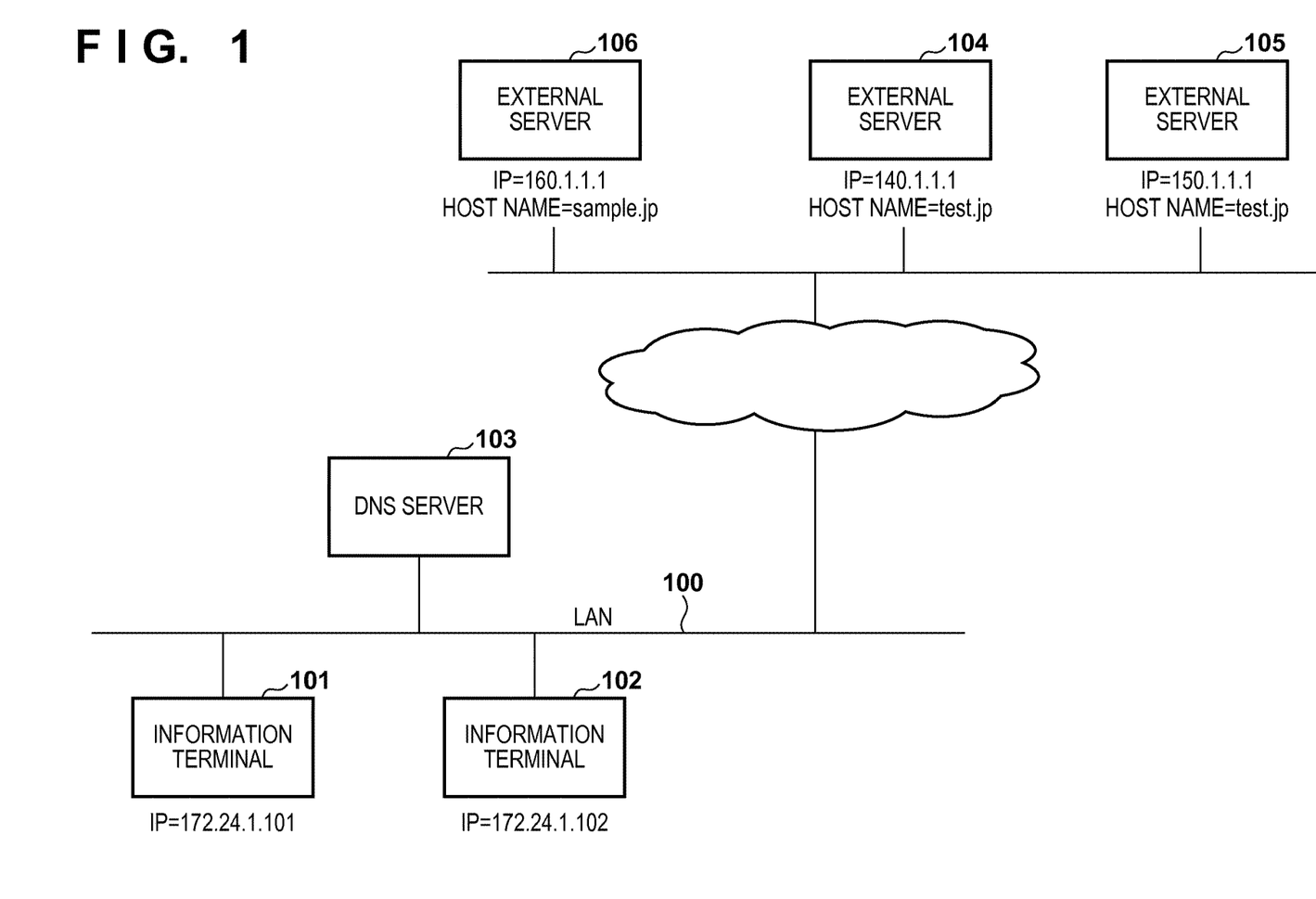
FIG. 1 is a view for illustrating a network configuration according to an embodiment.

First, explanation is given for a network configuration according to an embodiment of the present invention with reference to FIG. 1. A LAN 100 is subnet of 172.24.0.0/16, and is comprised of and includes information terminals 101 and 102, and a DNS (Domain Name System) server 103. The information terminals 101 and 102 are examples of an information processing apparatus, are equipped with a transmission filtering function, and exist on the LAN 100. A DNS server 103 holds records shown in FIG. 2, and returns a response to a DNS request from an information terminal based on a record that it holds. The information terminals 101 and 102 are connected to the DNS server 103 communicably through the LAN 100. Also, the information terminals 101 and 102 are capable of communicating with external servers 104, 105 and 106 through an external network.

The external servers 104, 105 and 106 exist on the Internet, and hold global IP addresses and host names, and each is registered in the DNS server 103. The external server 104 holds a host name "TEST.JP" and an IP address "140.1.1.1". The external server 105 denotes a replacement device for the external server 104 and holds "TEST.JP" and an IP address "150.1.1.1". For convenience, the external servers 104 and 105 are described at the same time in FIG. 1, but actually they do not exist on the Internet at the same time because the external server 105 is a replacement device for the external server 104. The external server 106 holds a host name "SAMPLE.JP" and an IP address "160.1.1.1".

<DNS Record>

Figure 2:
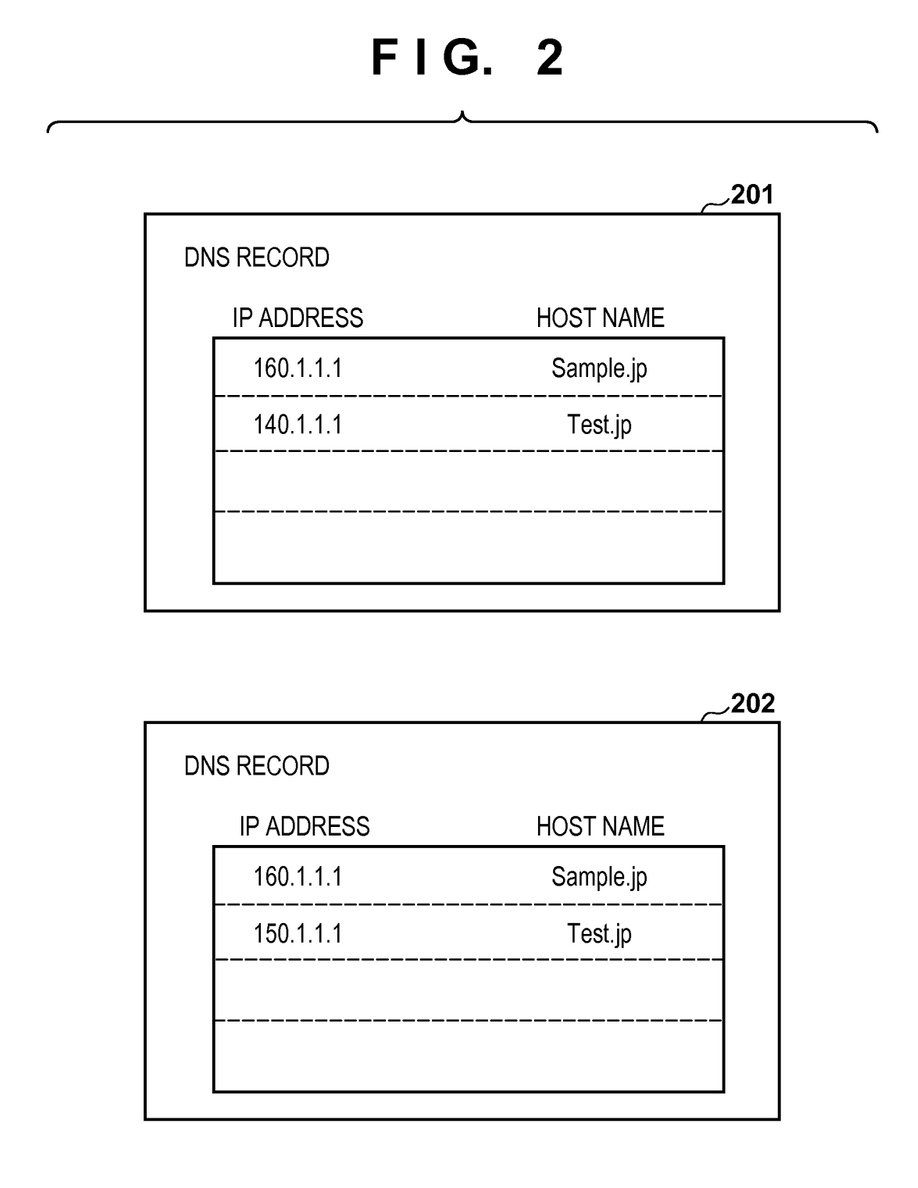
FIG. 2 is a view for showing an example of a record registration according to an embodiment.

Next, explanation is given for an example of DNS record stored in the DNS server 103, with reference to FIG. 2. In a case of a record 201, "TEST.JP" is associated with "140.1.1.1". Meanwhile, in a case of a record 202, "TEST.JP" is associated with "150.1.1.2". In other words, information of the external server 104 and the external server 106 are stored in the record 201. On the other hand, the information of the external server 105 and the external server 106 is stored in the record 202 after the external server 104 is changed to the external server 105. In this way, a DNS record linking each IP address and host name of a plurality of the external servers connected through the network is managed by the DNS server 103.

<Hardware Configuration of Information Terminal>

Figure 3:
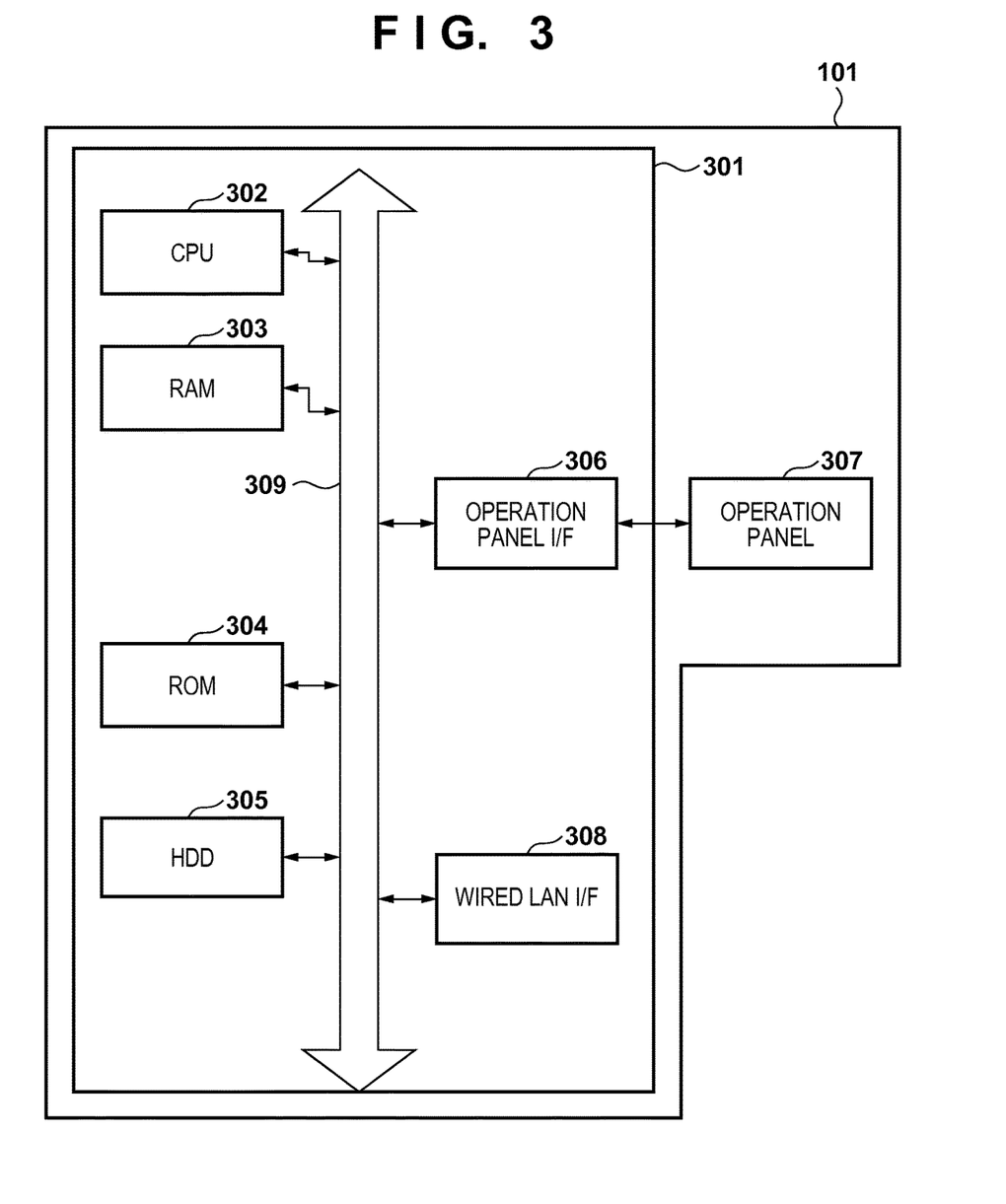
FIG. 3 is a view for illustrating a hardware configuration of an information terminal according to an embodiment.

Next, explanation is given for a hardware configuration of the information terminal 101 according to an embodiment with reference to FIG. 3. Here, explanation is given for a hardware configuration of the information terminal 101; the hardware configuration of the information terminal 102 is of a similar configuration to that of the information terminal 101, so the explanation will be omitted. The information terminal 101 comprises a control unit 301 and an operation panel 307. The control unit 301 comprises a CPU 302, a RAM 303, a ROM 304, an HDD 305, an operation panel I/F 306, and a wired LAN I/F 308.

The control unit 301 comprehensively controls operation of the information terminal 101 on the whole. The CPU 302 performs various controlling, such as control for communication, by reading out control programs stored in the ROM 304. The RAM 303 is used for a temporary storage area such as a main memory and a work area for the CPU 302. The HDD 305 stores data, various programs, or various setting information.

The operation panel I/F 306 connects the operation panel 307 to the control unit 301. A liquid crystal display unit having a touch panel function, a keyboard, or the like, are comprised in the operation panel 307. The wired LAN I/F 308 transmits information to an external terminal such as an external image processing controller by wire, or receives various information from such an external apparatus. Each block in the control unit 301 is connected by a system bus 309.

<Software Configuration of Information Terminal>

Figure 4:
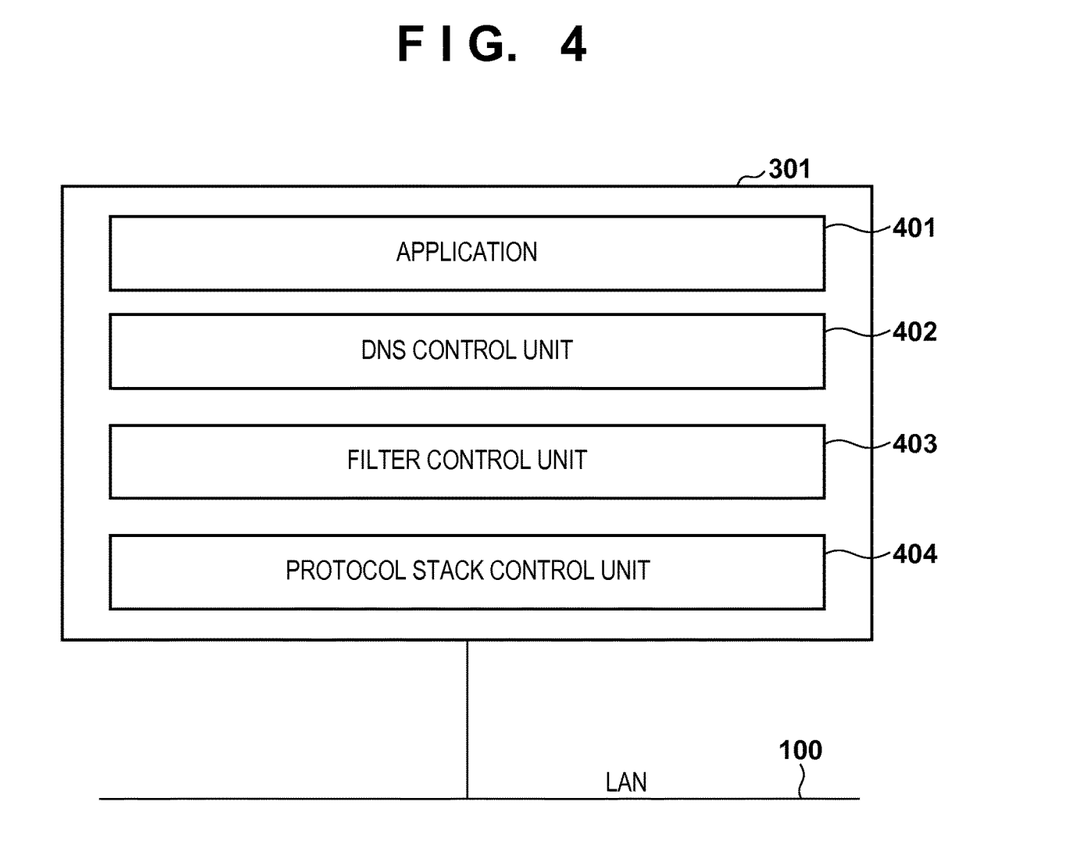
FIG. 4 is a view for illustrating a software configuration of an information terminal according to an embodiment.

Next, explanation is given for a software configuration of the information terminal 101 according to an embodiment with reference to FIG. 4. Here, explanation is given for a software configuration of the information terminal 101; the software configuration of the information terminal 102 is of a similar configuration to that of the information terminal 101, so the explanation thereof will be omitted. The control unit 301 is comprised of an application 401, a DNS control unit 402, a filter control unit 403, and a protocol stack control unit 404 as a software configuration.

The application 401 performs a data communication designating at least one of an IP address or a host name for specifying an external terminal such as an external server. The DNS control unit 402 is a control unit for transmitting a name resolution request to the DNS server 103 and acquiring an IP address corresponding to the host name in a case where the destination of the transmission data is a host name. The filter control unit 403 determines whether a transmission to the destination of the transmission data is permitted or prohibited, and performs filter control to allow the transmission data to pass through or to discard the transmission data. The protocol stack control unit 404 performs communication exchange with an external terminal through the wired LAN I/F 308.

<Screen Transition Upon Transmission Filter Setting>

Figure 5:
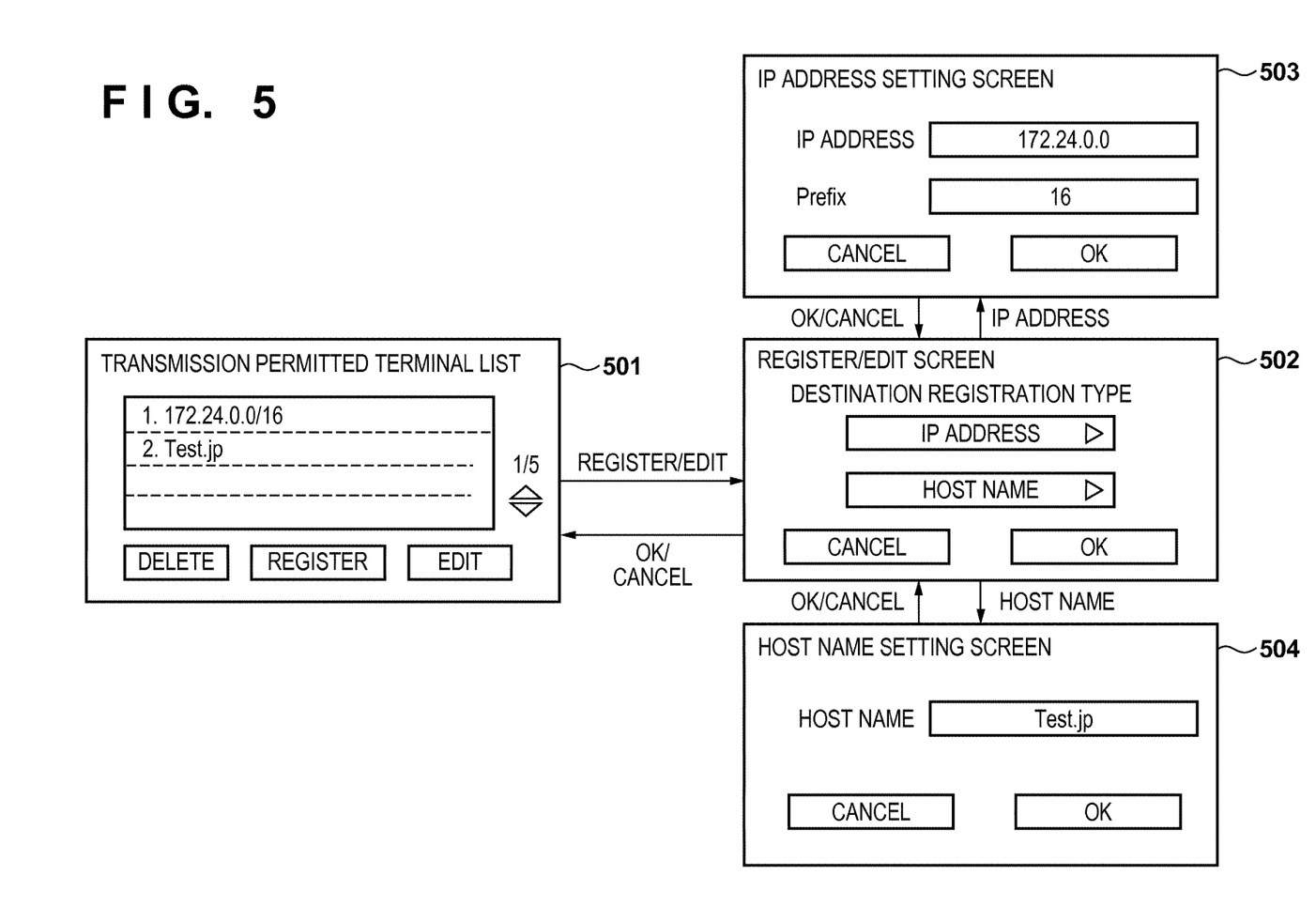
FIG. 5 is a view for showing an example of a setting according to an embodiment.

Next, explanation is given for screen transition upon transmission filter setting of the information terminal 101 according to an embodiment with reference to FIG. 5. Screens 501-504 shown in FIG. 5 are displayed on the display unit of the operation panel 307 of the information terminal 101. The screen 501 is a main screen of the screens for registering and editing a list of terminals to which transmission is permitted. The screen 501 shown in FIG. 5 illustrates a state where terminal destinations on the LAN 100 to which the information terminal 101 belongs in 172.24.0.0/16, and the host name "TEST.JP" are set to the transmission permitted terminal list as permitted destinations. In a case where the user would like to perform editing of existing registered content or a new registration, the user selects an "edit" button or a "register" button on the screen 501 to make a transition to a screen 502. The screen 502 functions as a reception unit.

An IP address and a host name can be selected as a destination registration type on the screen 502. When either is selected and an OK button is operated, transition to the respective setting screen is made. More specifically, in a case where it is desired that a permitted terminal be registered by IP address designation, transition to a screen 503 is made by selecting an "IP address" button on the screen 502 and operating an OK button. Meanwhile, in a case where it is desired that a permitted terminal be registered by host name designation, transition to a screen 504 is made by selecting a "host name" button on the screen 502 and operating the OK button.

On the screen 503, a user can set a desired IP address and prefixed range. Also, on a screen 504, the user can set a desired host name. On each screen, when the OK button is operated after the information is set, the set information is newly registered, or updating to the set information is performed. In this way, screens where a host name and an IP address to be set on a transmission permitted terminal list can be input individually are provided, and the permission information inputted to the transmission permitted terminal list is set in accordance with the user input through the screen in the information terminal 101.

<Processing Procedure>

Figure 6:
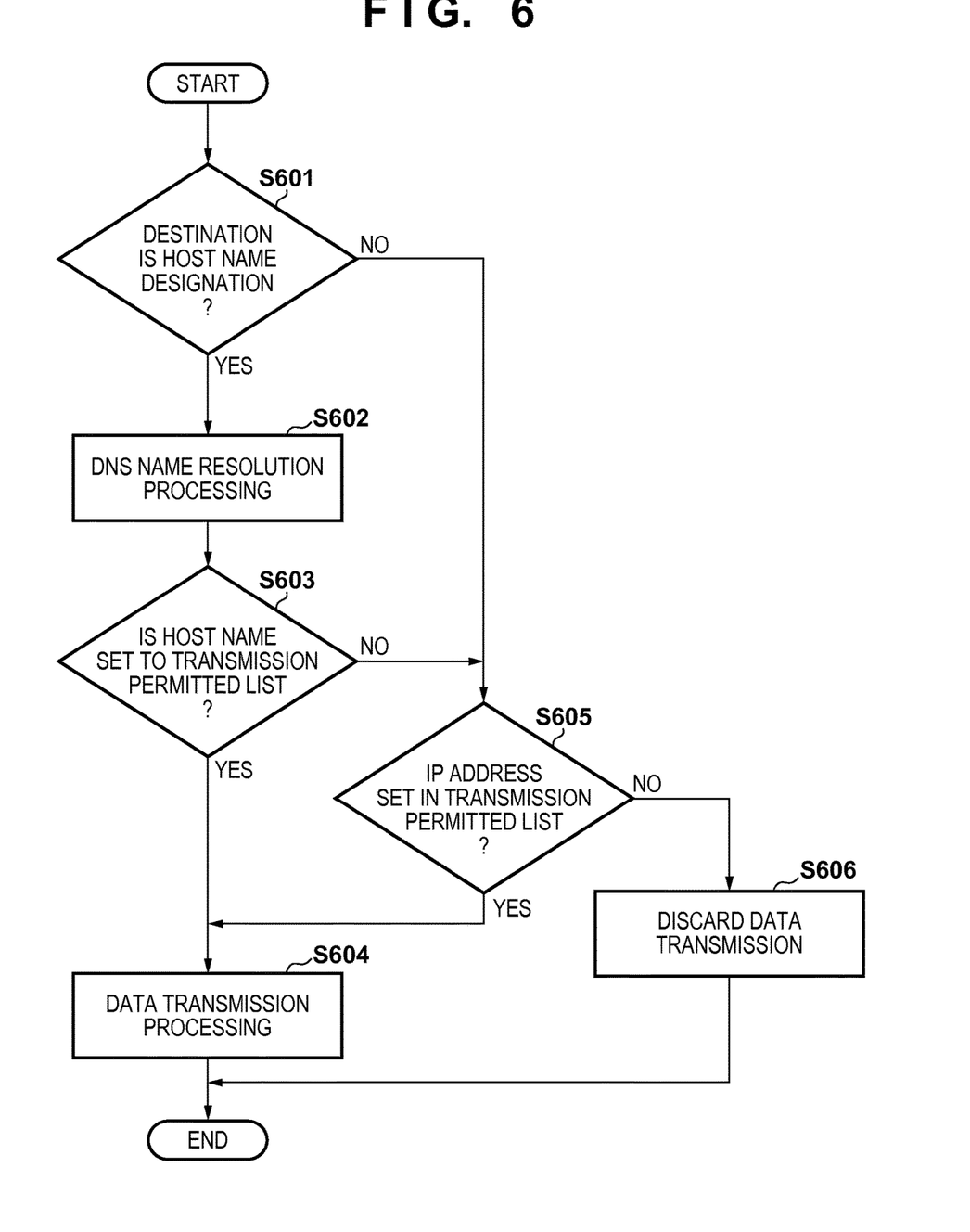
FIG. 6 is a flowchart for transmission filter control processing of a CPU according to an embodiment.

Next, explanation is given for a processing procedure of the CPU 302 in a case where the information terminal 101 transmits data to the external terminal in an embodiment, with reference to FIG. 6. The processing explained below is realized by the CPU 302 reading a program stored in the ROM 304 or the HDD 305 into the RAM 303 and executing it. Also, the number continuing after S shown below indicates the step number of each process.

The DNS control unit 402 determines whether the destination of data to be transmitted is an IP address designation or a host name designation in step S601. In a case where it is determined that the destination is the host name designation, the processing proceeds to step S602; when that is not the case the processing proceeds to step S605. In step S602, the DNS control unit 402 transmits a DNS request to the DNS server 103, and performs name resolution processing.

Continuing on, in step S603, the filter control unit 403 determines whether or not the host name for which name resolution is performed by the DNS server 103 is set to the transmission permitted terminal list (permission information) in FIG. 5. Based on the result of the determination, in a case where it is set to the transmission permitted terminal list, the processing proceeds to step S604; when that is not the case the processing proceeds to step S605. In step S604, the filter control unit 403 controls so that transmission to an IP address resolved from a host name can be permitted, even if the IP address is not set to the transmission permitted terminal list. For this reason, the application 401 can perform communication by establishing a connection to the external server "TEST.JP" by the protocol stack control unit 404.

On the other hand, in a case where the host name resolved by the DNS is not set in the transmission permitted terminal list in FIG. 5, a name resolved IP address is passed to the application 401 without being controlled. After this, the controlling is equivalent to the controlling for communicating with an external server by the address designation of the IP address from the application 401. In other words, the application 401 attempts to perform a data transmission to the IP address of the external server. More specifically, the CPU 302 moves the processing to step S605.

In step S605, the filter control unit 403 determines whether or not the designated IP address is set to the transmission permitted terminal list in FIG. 5. If it is set to the transmission permitted terminal list, the processing proceeds to step S604, and if it is not set the processing proceeds to step S605. In step S604, the filter control unit 403 controls to permit transmission. With this, the application 401 can perform communication by establishing a connection to the external server by the protocol stack control unit 404. On the other hand, in a case where it is not set in the transmission permitted terminal list, the filter control unit 403 prohibits transmission and discards the transmission data in step S606. That is, under the condition where neither the host name nor the IP address are not included in the transmission permitted terminal list (permission information), the execution of the data transmission is prohibited.

In this way, in the processing for restricting access with an external terminal, in a case where the host name is set, the information terminal 101 according to the present embodiment determines whether or not it is defined in the transmission permitted terminal list using the host name preferentially. On the other hand, in a case where the host name is not defined in the transmission permitted terminal list, and in a case where only the IP address and not the host name is set in the list, it is determined, using the IP address, whether or not it is defined in the transmission permitted terminal list. In this way, by determining a transmission permitted terminal generally using the host name, in a case where the IP address of the external terminal is changed and in a case where it is not reflected in the transmission permitted terminal list, a connection can be established suitably by performing the connecting destination filtering.

<Sequence>

Figure 7:
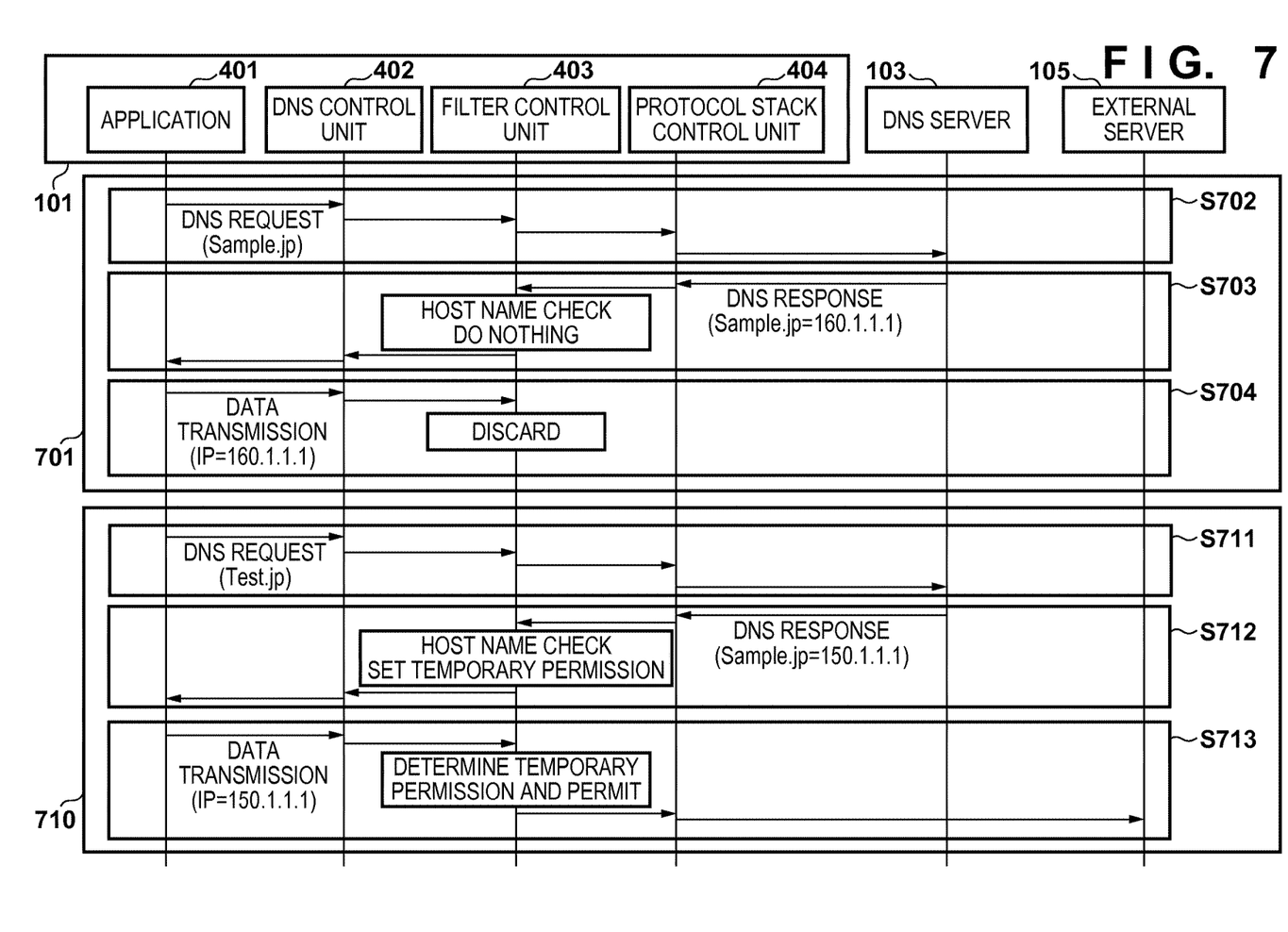
FIG. 7 is a view for illustrating a transmission sequence of an information terminal according to an embodiment.

Next, explanation is given for a transmission sequence in a case in which data transmission is performed, where the host name is designated in the information terminal 101 in an embodiment with reference to FIG. 7. Below, explanation is given using an example of controlling where a data transmission is filtered using the transmission permitted terminal list shown in FIG. 5. That is, as shown in FIG. 5, "172.24.0.0/16" and "Test.jp" is defined as transmission permitted terminals in the transmission permitted terminal list.

A sequence 701 indicates a sequence in a case where a host name that is not set in the transmission permitted terminal list in FIG. 5 is designated. In step S702, the application 401 transmits a name resolution request for resolving the host name of the external server 106 "SAMPLE.JP" to the DNS server 103. In step S703, the DNS server 103 responds with the IP address "160.1.1.1"

corresponding to "SAMPLE.JP". At that time, the filter control unit 403 confirms the host name is not set to the transmission permitted terminal list, and transfers the packet data to the application 401 through the DNS control unit 402 without any particular control. After that, the application 401 performs data transmission to the IP address 160.1.1.1 in step S704. However, it is discarded by the filter control unit 403 because this IP address is not set to the transmission permitted terminal list in FIG. 5.

A sequence 710 indicates the sequence in a case where the host name set in the transmission permitted terminal list in FIG. 5 is designated. In step S711, the application 401 transmits a name resolution request for resolving the host name of the external server 105 "TEST.JP" to the DNS server 103. In step S712, the DNS server 103 responds the IP address "150.1.1.1" corresponding to "TEST.JP". At that time, the filter control unit 403 confirms that the IP address "150.1.1.1" is not set in the transmission permitted terminal list but the host name is set in the transmission permitted terminal list, and controls so that transmission can be permitted because it is treated as being in the transmission permitted terminal list. After that, the application 401 performs data transmission to the IP address 150.1.1.1 in step S713. The IP address is not set in the transmission permitted terminal list of FIG. 5 but because the filter control unit 403 can permit transmission, it can establish communication with the external server 104.

As explained above, the information processing apparatus according to the present embodiment performs filter control using a host name upon performing a data transmission. More specifically, if the host name is defined in the list as a transmission permitted terminal, even if the corresponding IP address is not defined in the list, it controls to permit and executes the transmission processing. Accordingly, because the user can perform transmission filter control using host name designation, even if the IP address of the external server is changed, the appropriate access control can be realized. There are cases where an IP address of an external server changes frequently, but the host name mostly does not change, and thus a host name designation as in the present embodiment is an effective solving approach.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like. While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-198877 filed on Sep. 29, 2014, which is hereby incorporated by reference herein in its entirety.

What is claimed is:

1. An information processing apparatus comprising:
a processor; and
a memory storing instructions which, when executed by the processor, cause the information processing apparatus to:
determine, when a data transmission is executed, whether or not a host name designated as a destination of the data transmission is set to a terminal list indicating an external terminal that is permitted as a data transmission destination;
permit, in a case where a result of the determination is that the host name is set to the terminal list, data transmission irrespective of whether or not an IP address corresponding to the host name is set to the terminal list;
determine, in a case where the result of the determination is not that the host name is set to the terminal list, whether or not the IP address designated as the destination of the data transmission is set to the terminal list;
permit, if a result of the determination is that the IP address is set to the terminal list, the data transmission; and
execute data transmission if data transmission is permitted.

2. The information processing apparatus according to claim 1, further comprising an interface configured to receive a host name and an IP address indicating an external terminal that is permitted as a data transmission destination, wherein the instructions, when executed by the processor, further cause the information processing apparatus to set the host name and the IP address to the terminal list.

3. The information processing apparatus according to claim 1, wherein the instructions, when executed by the processor, further cause the information processing apparatus to:
prohibit, if a result of the determination is the IP address is not set to the terminal list, data transmission.

4. The information processing apparatus according to claim 1, wherein the instructions, when executed by the processor, further cause the information processing apparatus to:
in a case where the result of the determination is not that the host name is set to the terminal list, determine whether or not an IP address designated as a destination of the data transmission is set to the terminal list, and permit, if a result of the determination is that the IP address is set to the terminal list, data transmission, and prohibit, if a result of the determination is that the IP address is not set to the terminal list, data transmission.

5. The information processing apparatus according to claim 3, wherein the instructions, when executed by the processor, further cause the information processing apparatus to discard data relating to the data transmission if the data transmission is prohibited.

6. The information processing apparatus according to claim 1, wherein the instructions, when executed by the processor, further cause the information processing apparatus to:
acquire, by querying a DNS server that is communicable via a network, an IP address corresponding to the host name; and
execute data transmission using the acquired IP address.

7. The information processing apparatus according to claim 6, wherein the IP address corresponding to the host name is the acquired IP address.

8. The information processing apparatus according to claim 2, wherein the interface receives, by a user input via a screen by which a host name and an IP address are individually inputtable, information that is input in the terminal list.

9. An information processing apparatus comprising:
an interface that receives a host name or an IP address from a user for specifying an external terminal that is permitted as a data transmission destination;
a storage that stores, as permission information indicating an external terminal that is permitted as a data transmission destination, the host name or the IP address received by the interface; and
a controller that permits execution of data transmission in a case where a host name is received as a destination of a data transmission and the received host name is included in the permission information, determines whether or not an IP address corresponding to the received host name is included in the permission information in a case where the host name is received as a destination of a data transmission and the received host name is not included in the permission information, and permits execution of data transmission if a result of the determination is that the IP address is included in the permission information.

10. The information processing apparatus according to claim 9, wherein, in a case where a host name is received as a destination of a data transmission, the controller prohibits execution of data transmission under a condition that neither the received host name nor an IP address corresponding to the received host name is included in the permission information.

11. The information processing apparatus according to claim 9, wherein, in a case where an IP address is received as a destination of data transmission, the controller permits execution of data transmission under a condition that the received IP address is included in the permission information, and does not permit execution of data transmission under a condition that the received IP address is not included in the permission information.

12. The information processing apparatus according to claim 9, wherein the information processing apparatus executes, in a case where execution of data transmission is permitted by the controller, the data transmission.

13. A method of controlling an information processing apparatus, the method comprising:
determining, when a data transmission is executed, whether or not a host name received as a destination of the data transmission is set to a terminal list indicating an external terminal that is permitted as a data transmission destination;
in a case where a result of the determination is that the host name is set to the terminal list, permitting data transmission irrespective of whether or not an IP address corresponding to the host name is set to the terminal list;
determining, in a case where the result of the determination is not that the host name is set to the terminal list, whether or not the IP address designated as a destination of the data transmission is set to the terminal list;
permitting the data transmission if a result of the determination is that the IP address is set to the terminal list and
executing data transmission if data transmission is permitted.

14. A method of controlling an information processing apparatus, the method comprising:
receiving a host name or an IP address from a user for specifying an external terminal that is permitted as a data transmission destination;
storing, as permission information indicating an external terminal that is permitted as a data transmission destination, the received host name or the received IP address;
permitting execution of data transmission in a case where a host name is received as a destination of a data transmission and the received host name is included in the permission information;
determining whether or not an IP address corresponding to the received host name is included in the permission information in a case where the host name is received as a destination of a data transmission and the received host name is not included in the permission information; and
permitting execution of data transmission if a result of the determination is that the IP address is included in the permission information.

15. A non-transitory computer-readable storage medium on which is stored code of a computer program for causing a computer to execute a method for controlling an information processing apparatus, the method comprising:
determining, when a data transmission is executed, whether or not a host name received as a destination of the data transmission is set to a terminal list indicating an external terminal that is permitted as a data transmission destination;
in a case where a result of the determination is that the host name is set to the terminal list, permitting data transmission irrespective of whether or not an IP address corresponding to the host name is set to the terminal list;
in a case where the result of the determination is not that the host name is set to the terminal list, determining whether or not the IP address designated as a destination of the data transmission is set to the terminal list;
permitting the data transmission if a result of the determination is that the IP address is set to the terminal list; and
executing data transmission if data transmission is permitted.

16. A non-transitory computer-readable storage medium on which is stored code of a computer program for causing a computer to execute a method for controlling an information processing apparatus, the method comprising:
- receiving a designation of a host name or an IP address from a user for specifying an external terminal that is permitted as a data transmission destination;
- storing, as permission information indicating an external terminal that is permitted as a data transmission destination, the received host name or the received IP address;
- permitting execution of data transmission in a case where a host name is received as a destination of a data transmission and the received host name is included in the permission information;
- determining whether or not an IP address corresponding to the host name is included in the permission information in a case where the host name is received as a destination of a data transmission and the received host name is not included in the permission information; and
- permitting execution of data transmission if a result of the determination is that the IP address is included in the permission information.

\* \* \* \* \*